(12) United States Patent
Meier

(10) Patent No.: US 7,379,571 B2
(45) Date of Patent: May 27, 2008

(54) METHOD OF ENCODING LINES

(76) Inventor: Reinhard Meier, Zum Vorwerk 6a, 21614 Buxtehude (DE)

( * ) Notice: Subject to any disclaimer, the term of this patent is extended or adjusted under 35 U.S.C. 154(b) by 394 days.

(21) Appl. No.: 10/524,531

(22) PCT Filed: Aug. 5, 2003

(86) PCT No.: PCT/IB03/03502

§ 371 (c)(1),
(2), (4) Date: Sep. 1, 2005

(87) PCT Pub. No.: WO2004/015616

PCT Pub. Date: Feb. 19, 2004

(65) Prior Publication Data

US 2006/0120574 A1    Jun. 8, 2006

(30) Foreign Application Priority Data

Aug. 13, 2002 (DE) .................. 102 37 011

(51) Int. Cl.
*G06K 9/00* (2006.01)

(52) U.S. Cl. ....................................... 382/125
(58) Field of Classification Search .................... None
See application file for complete search history.

(56) References Cited

U.S. PATENT DOCUMENTS

| | | | | |
|---|---|---|---|---|
| 6,173,068 | B1 * | 1/2001 | Prokoski | 382/115 |
| 6,233,348 | B1 * | 5/2001 | Fujii et al. | 382/125 |
| 6,876,757 | B2 * | 4/2005 | Yau et al. | 382/125 |

OTHER PUBLICATIONS

Gokmen M et al "Compression of Fingerprint Images Using Hybrid Image Model" Proceedings of the International Conference on Image Processing (ICIP) Conference Sep. 16-19, 1996.

* cited by examiner

*Primary Examiner*—Brian P. Werner
*Assistant Examiner*—Elisa M Rice
(74) *Attorney, Agent, or Firm*—Peter Zawilski

(57) ABSTRACT

In a method of encoding lines in a print from the skin and particularly a fingerprint, one line at a time is encoded by means of vertices, which include the starting point and the end point, that are situated on the line, in which case segments of connecting line between adjacent vertices are no more than a preset distance away from the line.

6 Claims, 4 Drawing Sheets

METHOD OF ENCODING LINES

FIELD OF THE INVENTION

The invention relates to a method of encoding lines in a print from the skin, and particularly a fingerprint.

BACKGROUND OF THE INVENTION

To allow fingerprints to be identified, images of the fingerprints are analyzed, this being done by extracting characteristic features, particularly endings and branchings of the ridges on the skin, and comparing them with reference features that are held in store.

To enable the characteristic features to be extracted, it is necessary for the images to be pre-processed and the details produced by the pre-processing to be pre-processed and stored. A step that is frequently taken as part of the pre-processing is so-called skeletonization, in which the ridges, which are a plurality of picture elements (pixels) wide, are reduced to lines only one pixel wide. Before this is done, the brightness levels are turned into binary values. To store a line of this kind, all the raster dots that go to make up the line therefore have to be stored in the memory together with their co-ordinates. Given the large number of lines that there are, this takes up a considerable amount of space in the memory.

It is therefore an object of the invention to encode the lines in a manner that reduces the data without there being any loss of the information required for structural analysis.

SUMMARY OF THE INVENTION

This object is achieved in accordance with the invention in that one line at a time is encoded by means of vertices, which include the starting point and the end point, that are situated on the line, such that connecting line segments between adjacent vertices are no more than a preset distance away from the line.

It is not only a saving in storage space that is made possible by the method according to the invention. The subsequent structural analysis, and particularly the extraction of characteristic features, takes places faster and more easily than with a binary image that comprises the skeletonized ridges. Depending on the methods that are employed for the purpose, it is enough for only the vertices to be covered, without the line as such having to be decoded by calculating other points situated on the segments of connecting line.

One embodiment of the method according to the invention makes it possible for the vertices to be determined in a particularly advantageous way in that, after the starting point and the end point have been determined, a search is made for that point on the line that is the maximum distance away from a connecting line between the starting point and the end point, the point that is the maximum distance away is stored as a first vertex, a search is made, between the first vertex and the starting point and the end point, for other points that are the maximum distance away from their associated segment of connecting line, the points that are found constitute a second and a third vertex, between which and the starting point, the end point and the first vertex a search is made for further points each at the maximum distance, which further points form further vertices, and a search of this kind is continued until such time as no point is found that is at a distance greater than the preset distance.

The preset distance will depend on various attributes of the print from the skin, such as on the distance between the lines and the maximum curvature of the latter. It has proved advantageous in practice if the preset distance is less than a third of the distance between the lines.

The branchings in ridges that occur in prints from the skin can be allowed for in the method according to the invention by splitting branching lines apart at the branch. When this is done, it has proved advantageous if all three limbs of the branch are each processed as single lines. The splitting-apart then also causes a starting point and an end point to be defined for each of these lines.

Where there are closed lines, which also occur in prints from the skin, provision may be made in the method according to the invention for closed lines to be broken open. A starting point and an end point are then defined for the broken-open line too.

In an advantageous embodiment of the method according to the invention, the perpendicular from the given point to the straight line comprising a connecting line is calculated when determining a distance from the connecting line. However, where there are pronounced curvatures, this embodiment may, under certain circumstances, produce errors but it does impose only a relatively small burden in terms of calculation.

Another embodiment of the method according to the invention allows distance to be determined correctly even in cases where there are pronounced curvatures and involves the distance between one point at a time and a connecting line or segment thereof being calculated as the distance to the start or end of the connecting line or segment thereof if the perpendicular from the given point to the straight line containing the connecting line or segment thereof is not situated on the connecting line or segment thereof.

These and other aspects of the invention are apparent from and will be elucidated with reference to the embodiments described hereinafter.

DESCRIPTION OF PREFERRED EMBODIMENTS

Figure 1:
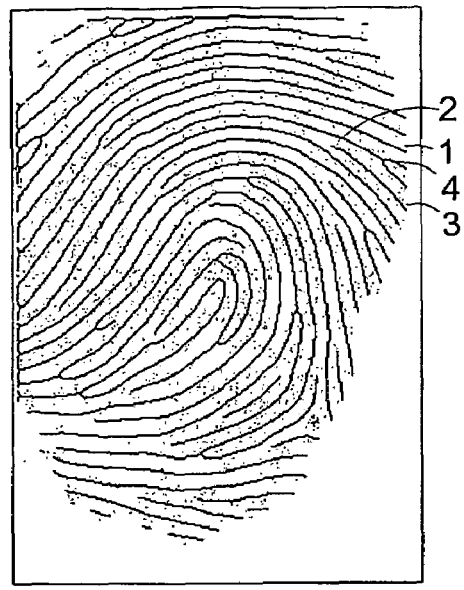
FIG. 1 shows a skeletonized fingerprint.

FIG. 1 shows a fingerprint, after pre-processing into the form of a raster image in binary form made up of, for example, 250×350 pixels, which may each assume a value of 0 or 1 (black or white). The image contains various lines 1 that have starting points 2, end points 3 and branchings 4.

Figure 2:
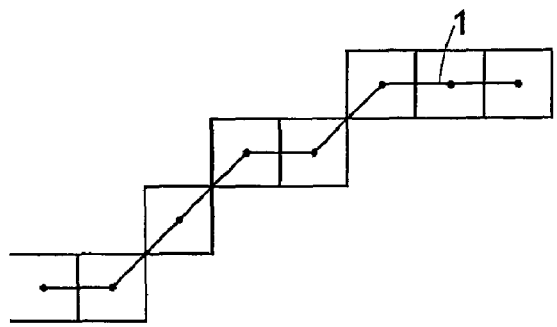
FIG. 2 is a diagrammatic view of a skin ridge that has been skeletonized into a run of line.

FIG. 2 is a diagrammatic view of one of the skeletonized lines, each of which is only one pixel wide. A line connecting the centers of the pixels making up the skeletonized line represents a run of line of which the individual points would, without the method according to the invention, have to be stored together with their co-ordinates.

To enable the lines 1 to be individually encoded, in a first step of the method the end points and branch points are found in the skeletonized image. This is done by known methods. For this purpose, a search is, for example, made for points having the binary value representing a line (black in the Figures) that have only one neighbor of the same binary value. In the case of branchings, a search is, for example, made for points that have more than two neighbors.

This produces lines that each have a starting point and an end point. By a tracing process, these lines are each converted into an array of points, the co-ordinates of the points of one run of line at a time being stored in a memory in the sequence in which they are found in the tracing process.

To enable the storage space required to be reduced, a check is now made to see which of the inner points along each line are required (i.e. "necessary") to represent the line to within a preset standard of accuracy. The standard laid down for this purpose is that none of the points in the original run of line should be more than a preset distance away from the reduced run of line. Before the method proper is considered, two ways of determining the distance between a point and a connecting line between the two ends of a run of line AB will be explained by reference to FIG. 3.

Figure 3A:
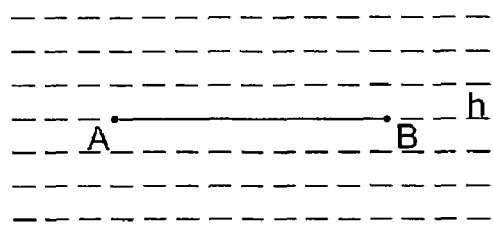
FIG. 3 shows representations relating to the determination of the distance of a point from a connecting line.
Figure 3B:
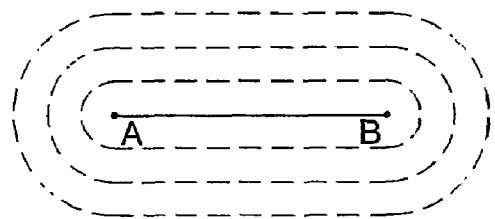
Figure 3C:
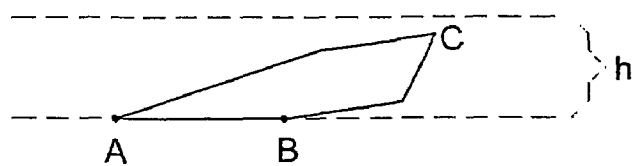

In the variant shown in FIG. 3a, all that is done is to determine the distance to the straight line that extends through the ends A and B. This is enough whenever, for any point whose distance from the straight line is at most the preset distance h, the distance to the connecting line is likewise at most h.

In FIG. 3a, equidistant straight lines are shown in parallel with the straight line passing through A and B. This method can lead to errors in the case of lines having very pronounced curvatures, which is avoided in the case of the method shown in FIG. 3b. In this case, it is the actual distance from the connecting line between A and B that is determined, for which purpose it has to be established whether the perpendicular from the point to the straight line meets the straight line inside or outside A and B. In the first case, it is the distance to the closer of points A and B that is determined and in the second it is the distance to the connecting line, i.e. to the foot of the perpendicular. When use is being made of the method of determining distance shown in FIG. 3b, the binary image taken as a basis may contain any desired structures.

FIG. 3c again makes clear how distance is determined for a point C. With the method shown in FIG. 3a, a distance of less than h would be determined, which is clearly not the case. With the method shown in FIG. 3b however, the distance is determined as equal to the distance between C and B.

FIG. 4 illustrates individual steps in the method according to the invention by taking a line 1 as an example. First, as shown in FIG. 4a, a connecting line 5 is formed between the end points x1 and x9 of the line 1, which latter is, for example, initially made up of approximately 300 points. Next, that point on the line which is the greatest distance away from the connecting line 5 is calculated, namely point x5 in the present example. Segments 6, 7 of connecting line are formed in turn from point x5 to points x1 and x9 respectively (FIG. 4b). In the view shown in FIG. 4c are shown those points x3 and x7 that are the maximum distances away from the segments 6, 7 of connecting line (FIG. 4b), which points x3 and x7 in turn form starting points for further segments 8, 9, 10, 11 of connecting line, a process which in turn generates intermediate points x2, x4, x6 and x8 (FIG. 4d).

Figure 4A:
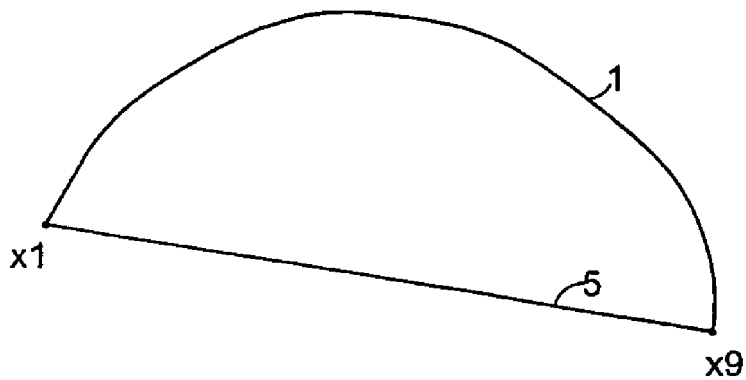
FIG. 4 shows a line that is being encoded by the method according to the invention.
Figure 4B:
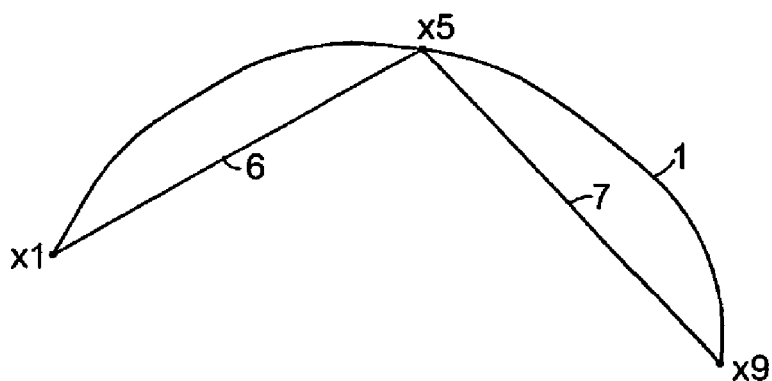
Figure 4C:
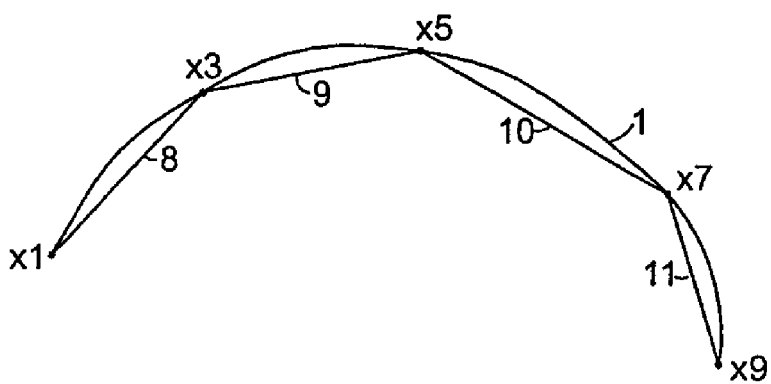
Figure 4D:
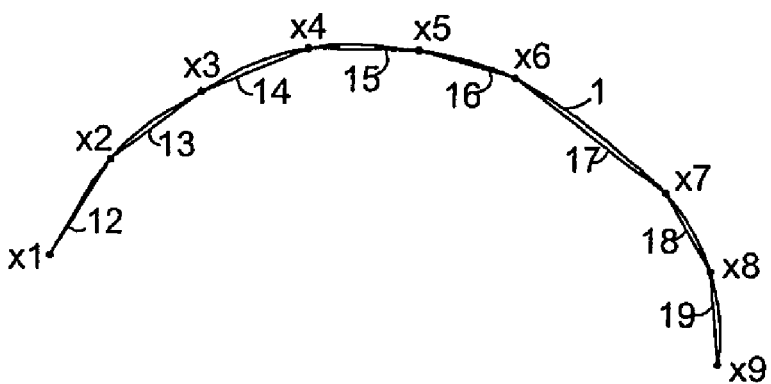

After the calculation of each of the segments 5 to 19 of connecting line, a check is made to see that none of the points on the line 1, between the points x1 to x9 defining a given segment of connecting line, is a distance greater than h away from the segment of connecting line (FIG. 3). If none of them is, a new vertex is not formed on the relevant portion of line. Once there is no point along the whole of the line that is further away than the corresponding segment of connecting line, then all the vertices are determined and are then entered in an array that fully defines the line to within the standard of accuracy required. In the example shown, the nine points x1 to x9 shown in FIG. 4d are all that are needed rather than the original 300 points.

In a study of 880 fingerprints, it was found that an average number of 275 points were required to represent or encode one complete fingerprint by the method according to the invention. In less than 2% of all the cases were more than 400 points required. If it is assumed that the position of a point can be stored in two bytes and that approximately another 100 bytes will be needed to separate the individual runs of line from one another in the memory by end markers, then a fingerprint can be stored in less than 1 kB with the method according to the invention. Uncompressed, even if stored bit by bit, a binary image measuring 256×384 pixels on the other hand requires 12 kB.

Added to the reduction in storage space, there is also another advantage that the invention has, namely that the vectorial representation allows a detailed structural analysis to be carried out. It is easier for the ridges to be examined for their length and direction. It is easier to find which minutiae are situated on a common ridge or how many ridges may, in a given case, be situated between two minutiae. The removal of artifacts (bridges, spurs, islands), which constitutes a major part of the work done to process fingerprints, is made easier.

Figure 5:
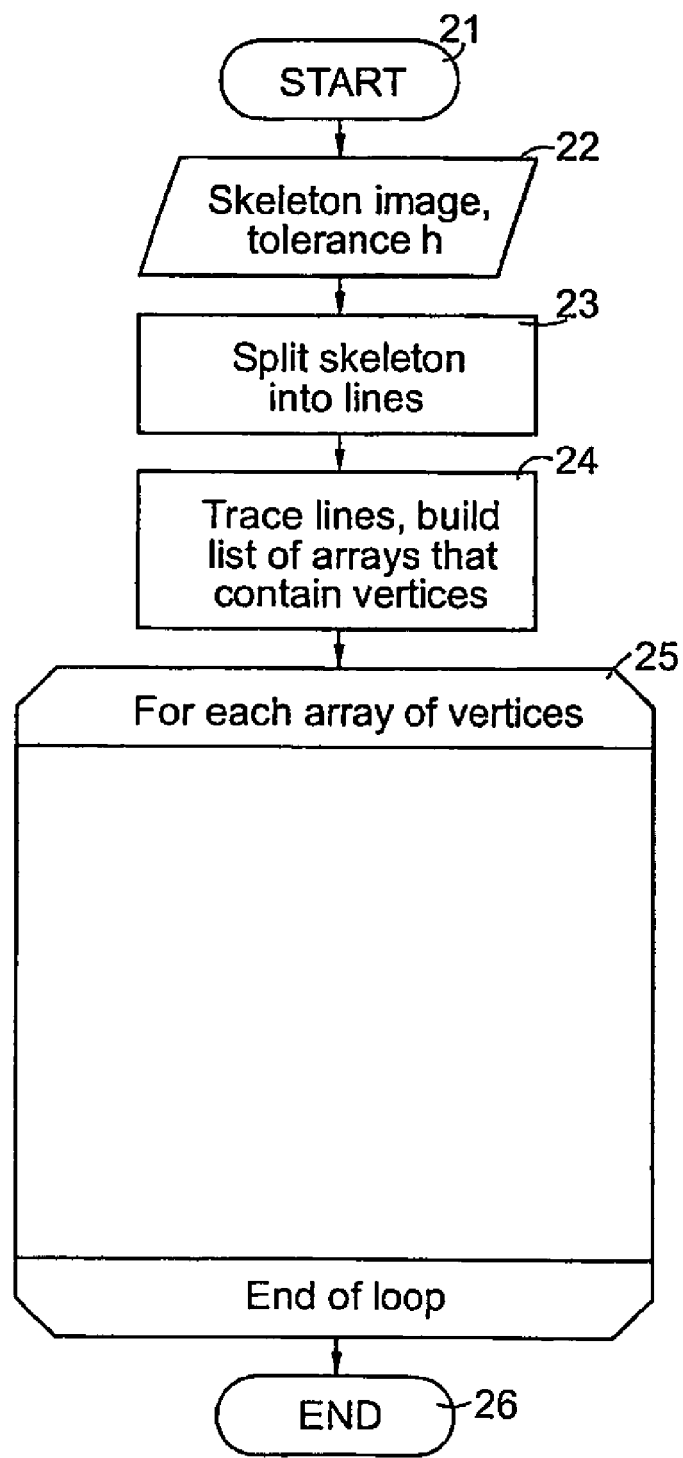
FIG. 5 shows a program for carrying out the method according to the invention in the form of a flow chart.

FIG. 5 shows a program for carrying out the method according to the invention in the form of a flow chart. After the start at 21, an image that has already been skeletonized (FIG. 1) is read in at 22, as also is a preset tolerance h. This is followed at 23 by the skeleton image being split up into individual lines. At 24 the lines are traced, thereby generating arrays of the points forming the lines. In the next step 25 of the program, which is performed for each of the lines obtained at 23, vertices are determined as shown in FIG. 4. The steps in the program that are involved here will be explained in detail in connection with FIG. 6. Once the vertices have been found for all the lines, the program is brought to an end at 26.

Figure 6:
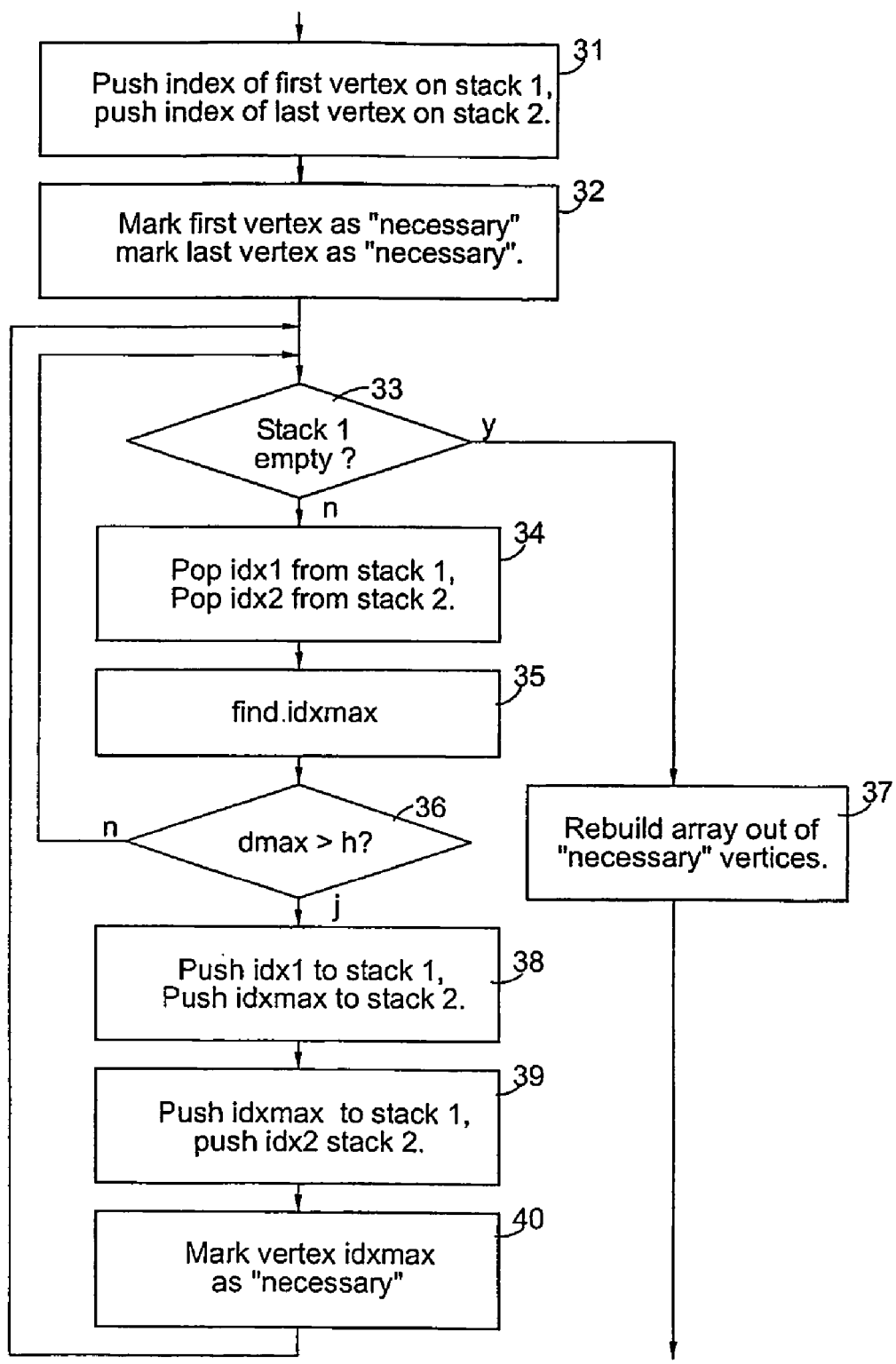
FIG. 6 is a more detailed view of part of the flow chart shown in FIG. 5.

The program shown in FIG. 6 is run for each of the lines. To start, the index of the first vertex, namely the starting point of the given line, is pushed onto a first stack at 31 and the index of the last vertex, namely the end point, is pushed onto a second stack. Next, the starting and end points are marked as "necessary". After a branch at 33, the two indexes idx1 and idx2 are popped from their respective stacks at 34, provided the stack is not empty. As was described in connection with FIG. 4, at 35 a search is made between points x1 and x2 for that point whose distance from the run of connecting line is a maximum.

If a point of this kind is found, a check is made at 36 to see whether the distance is greater than the tolerance h. If this is not the case when even the first vertex situated along the course of the line is calculated, then this vertex is not "necessary" because what is involved is a straight line within the tolerance h. The program is brought to an end after the branch at 33 by rebuilding the array from the "necessary" vertices in step 37 of the program, that is to say by deleting all the points on the line except the starting and end points.

If, however, the distance dmax is greater than h, then at 38 index idx1 is pushed onto stack 1 and the index idxmax for the point at the maximum distance is pushed onto stack 2, whereupon, at 39, the index idxmax for the point at the maximum distance is pushed onto stack 1 and the index idx2 for the end point is pushed onto stack 2. In this way, prerequisites have been met to allow a search to be made for further points between points x1, x5 and x9, the point at the maximum distance (point x5 in the program loop) having first been marked as "necessary" in step 40 of the program.

After this, a check is again made at 33 to see whether the stack is empty. This, however, will not be the case if a new vertex was found at 35. The next program loop then produces points x3 and x7. After this, points x2, x4, x6 and x8 are found. In the case described in connection with FIG. 4, dmax will not be greater than h in a further loop, whereupon it will be found at 33 that the stack is empty and an array of the "necessary" vertices will be compiled at 37.

The invention claimed is:

1. A method of encoding lines in a print from the skin, and particularly a fingerprint, characterized in that one line at a time is encoded by means of vertices, which include the starting point and the end point, that are situated on the line, such that connecting line segments between adjacent vertices are no more than a given distance away from the line, characterized in that the distance between one point at a time and a connecting line segment is calculated as the distance to the start or end of the connecting line segment if the perpendicular from the given point to the straight line containing the connecting line segment is not situated on the connecting line segment.

2. A method as claimed in claim 1, characterized in that, after the starting point and the end point have been determined, a search is made for that point on the line that is the maximum distance away from a connecting line between the starting point and the end point, the point that is the maximum distance away is stored as a first vertex, a search is made, between the first vertex and the starting point and the end point, for other points that are the maximum distance away from their associated connecting line segment, the points that are found constitute a second and a third vertex, between which and the starting point, the end point, and the first vertex a search is made for further points each at the maximum distance, which further points form further vertices, and a search of this kind is continued until such time as no point is found that is at a distance greater than said given distance.

3. A method as claimed in claim 1, characterized in that said given distance is less than a third of the distance between the lines.

4. A method as claimed in claim 1, characterized in that branching lines are split apart at the branching.

5. A method as claimed in claim 1, characterized in that closed lines are broken open.

6. A method as claimed in claim 1, characterized in that, in determining a distance from a connecting line segment, the perpendicular from the given point to the straight line containing the connecting line segment is calculated.

\* \* \* \* \*